3,392,115
HIGH-VISCOSITY QUATERNARY AMMONIUM BENZOSULFIMIDES

William J. Shibe, Jr., Riverton, N.J., and Marcus Sittenfield, Philadelphia, Pa., assignors to Hollichem Corporation, Camden, N.J., a corporation of New Jersey
No Drawing. Original application July 11, 1961, Ser. No. 123,127. Divided and this application Jan. 28, 1964, Ser. No. 340,798
5 Claims. (Cl. 252—8.55)

This invention relates to high-viscoisty quaternary ammonium compounds, and it particularly relates to high-viscosity quaternary ammonium benzosulfimides.

This is a divisional application of application Ser. No. 123,127, filed July 11, 1961, now abandoned.

The use of quaternary ammonium compounds as germicidal and fungicidal agents was heretofore well-known. Among these heretofore-known quaternaries were certain quaternary ammonium benzosulfimides (quaternary ammonium saccharinates) which differed from the ordinary quaternaries in being water-insoluble. These latter compounds, although having a biocidal activity which was generally superior to the water-insoluble quaternaries, had a tendency to settle or precipitate out of aqueous emulsions such as water-base paints, lotions, creams, etc. As a consequence, such formulations required much shaking or stirring before use. Furthermore, many of these products such as water-base paints, water-emulsion lotions and creams, etc. required thickening agents to maintain an adequate viscosity.

It has now been discovered that quaternary ammonium benzosulfimides wherein the quaternary radical has four alkyl groups attached to the nitrogen atom, one of these groups being a long-chain group having at least 14 carbon atoms in the chain and the other three groups being lower alkyls having no more than 5 carbon atoms in the chain, not only serves as a very active biocidal agent for the composition but also serves as a thickening agent whereby it increases the viscosity of the water-based composition and prevents settling or precipitating out of both itself and other materials such as pigments, fillers and the like. It is, indeed, a fact the viscosity of the composition increases to a maximum with increasing dilution with water, the quaternary here acting somewhat in the manner of a water-in-oil emulsion.

The compounds of the present invention are also sweet in taste and therefore are especially valuable in preparations for oral hygiene use since not only do they prevent precipitation of the emulsion but also obviate the necessity of using additives to mask the unpleasant and irritating taste of ordinary quaternaries.

Included within the scope of the present invention are such alkyl quaternary ammonium compounds as myristyl trimethyl ammonium benzosulfimide, cetyl trimethyl ammonium benzosulfimide, stearyl trimethyl ammonium benzosulfimide, arachidyl trimethyl ammonium benzosulfimide, behenyl trimethyl ammonium benzosulfimide, myristyl dimethyl ethyl ammonium benzosulfimide, cetyl dimethyl ethyl ammonium benzosulfimide, stearyl dimethyl ethyl ammonium benzosulfimide, arachidyl dimethyl ethyl ammonium benzosulfimide, and behenyl dimethyl ethyl ammonium benzosulfimide, etc.

The quaternary ammonium benzosulfimides of the present invention are prepared by reacting benzosulfimide or an alkali metal salt thereof with a selected quaternary ammonium salt, preferably a halide or sulfate, having the desired alkyl structure, as set forth above.

In one preferred method of preparing the compounds embodying this invention, the selected quaternary ammonium salt is dissolved in water. To this solution is added a stoichiometric amount of an alkali metal salt of benzosulfimide in aqueous solution. After thorough agitation, the aqueous reaction mass is evaporated to dryness and the dry residue is extracted with hot alcohol, preferably methanol or isopropanol. The alcoholic solution is then agitated and filtered and the insoluble salt removed. The filtrate is then evaporated to dryness and the residue is a quaternary ammonium salt embodying the present invention.

In another method, the selected quaternary ammonium salt, preferably a halide or sulfate, is dissolved in alcohol, preferably methanol or isopropanol.

A stoichiometric amount of benzosulfimide is also dissolved in alcohol and this solution is added to the quaternary ammonium solution. A stoichiometric amount of a solid alkali or alkaline earth metal oxide or hydroxide is then added with agitation and heat. The solution is then cooled and the resulting alkali or alkaline earth halide or sulfate salt is removed by filtration. The alcoholic filtrate is then evaporated under reduced pressure to recover the corresponding quaternary ammonium benzosulfimide as the residue.

The following specific examples are illustrative but not limitative of the above methods of preparation.

EXAMPLE 1

319.5 gms. (½ mol) of "Arquad 16–50" (produced by Armour Chem. Div., Armour & Co., Chicago, Ill.), a product containing a 50% concentration of cethyl trimethyl ammonium chloride, were diluted with 320 gms. of deionized water, thereby making a 25% solution of the chloride. 120 gms. (½ mol) of sodium benzosulfimide were dissolved in 360 cc. of deionized water. The two solutions were then blended and agitated for 5 minutes at ambient temperature and pressure to form a clear aqueous solution. This solution was then evaporated to dryness in a forced draft oven at 212° F. The dry residue was extracted with hot 99% methanol. The alcoholic solution was then agitated and filtered and the insoluble salt removed. The filtrate was then evaporated to dryness and the residue was cetyl trimethyl ammonium benzosulfimide in the form of a waxy solid.

EXAMPLE 2

347.5 gms. of "Arquad 18–50" (produced by Armour Chem. Div., Armour & Co., Chicago, Ill.), a product containing 50% concentration of stearyl trimethyl ammonium chloride, were dissolved in 350 gms. of isopropanol to make a 25% solution of 0.5 mol of the quaternary compound. 92 gms. of benzosulfimide were dissolved in 700 gms. of hot isopropanol and to this solution was added the quaternary solution. 20 gms. of sodium hydroxide pellets were then added to the mixture of the two alcoholic solutions while the mixture was agitated at a temperature of 140–150° F. The mixture was then allowed to cool to room temperature and the resulting salt was then evaporated under reduced pressure at 212° F. and the residue was stearyl trimethyl ammonium benzosulfimide.

EXAMPLE 3

The identical method was used as in Example 2 except that a stoichiometric amount of an alcoholic solution of KOH in isopropanol was substituted for the NaOH pellets. The final product was substantially the same as that of Example 2.

The following example of a white indoor, water-base paint is illustrative of compositions utilizing quaternary ammonium benzosulfimides embodying the present invention:

| Component: | Parts by wt. |
|---|---|
| Behenyl trimethyl ammonium benzosulfimide (1.5% solution in H₂O—about 2000 cps. viscosity) | 100 |
| "Tamol 731" (a sodium salt of a condensed aryl sulfonic acid; produced by Rohm & Hass Co., Philadelphia, Pa.) in 25% aqueous solution | 5 |
| "Colloid 606" (produced by Colloids, Inc., Newark, N.J.) | 3 |
| Ethylene glycol | 20 |
| "Titanox RA-50" (titaniam dioxide pigment; produced by Titanium Pigment Corp., Div. of Nat'l Lead Co., New York, N.Y.) | 220 |
| "Snowflake" (a diatomaceous earth produced by Johns-Manville Corp., New York, N.Y.) | 75 |
| "Celite 281" (a diatomaceous earth produced by Johns-Manville Corp., New York, N.Y.) | 50 |
| Carbitol | 16 |
| "Igepal CO-630" (100% nonyl phenoxy polyoxyethylene ethanol produced by General Aniline & Film Corp., New York, N.Y.) | 3 |
| Water | 250 |
| polyvinyl acetate (water emulsion having 50% solids) | 345 |
| "A.S.P.-400" (a clay produced by Minerals & Chemicals Corp. of America, Metuchen, N.J.) | 75 |

The behenyl trimethyl ammonium benzosulfimide, "Tamol 731," "Colloid 606," ethylene glycol, "Titanox RA-50," "Snowflake," "A.S.P.-400" "Celite 281" are mixed together in a mixer until a smooth paste is formed. The water is then added to achieve the desired milling viscosity and the mass is passed through a suitable milling machine. The Carbitol, "Igepal CO-630" and polyvinyl acetate are then added and thoroughly mixed into the composition. If necessary, additional water may be added to adjust the viscosity as desired.

In the above composition, the "Tamol 731" serves as a wetting agent, the "Colloid 606" serves as an antifoaming agent, the ethylene glycol serves as a coalescing agent, the "Titanox RA-50" is a white pigment, the "Snowflake" serves as a suspending agent and extender for the "Titanox," the "Celite 281" is a filler, the "Igepal CO-630" is used as a detergent and emulsifier and the "A.S.P.-400" is used to develop the flow and for leveling the paint.

The entire composition has a total solids content of 51% by weight. Of this content, the polyvinyl acetate constitutes 45.6% by weight. The viscosity of the composition is 74 ku.

The viscosity-increasing, thixotropic properties of the compounds of the present invention are not unduly affected by acid conditions such as caused by the presence of mineral acids. Nevertheless, the viscosity is even further increased under alkaline conditions in the pH range of 7-12. An even greater viscosity increase is provided by the presence of alkali metal, ammonium or alkaline earth salts, as distinguished from salt-free solutions. Decreased temperature conditions, of course, also serve to increase the viscosity.

Table I below illustrates the effect of temperature on the viscosities of a normally prepared (stoichiometric quantities) quaternary ammonium benzosulfimide (cetyl trimethyl ammonium benzosulfimide) as indicated by the Brookfield viscosity measurements. As so prepared, it will normally have an acidic pH in the absence of any additives, either acids, alkalis or salts. Table II below illustrates the effect of alkaline, acid and salt-presence conditions of the same compound at a constant temperature (75° F.) on the Brookfield viscosities:

TABLE I.—CETYL TRIMETHYL AMMONIUM BENZOSULFIMIDE

[1% Solution pH 4.6 (No additives)]

| Speed | Spindle | | | |
|---|---|---|---|---|
| | #4 | #3 | #2 | #1 |
| At 130° F.: | | | | |
| 6 | | | | 2.5 |
| 12 | | | | 2.5 |
| 30 | | | | 2.0 |
| 60 | | | | 3.0 |
| At 100° F.: | | | | |
| 6 | | | 12½ | 5 |
| 12 | | 25 | 12½ | 3¾ |
| 30 | 50 | 20 | 7½ | 5 |
| 60 | 50 | 15 | 8¾ | 5 |
| At 75° F.: | | | | |
| 6 | | 100 | 62½ | 40 |
| 12 | | 75 | 50 | 42½ |
| 30 | 100 | 40 | 40 | 38 |
| 60 | 100 | 40 | 40 | 36 |
| At 50° F.: | | | | |
| 6 | 1,000 | 800 | 650 | 600 |
| 12 | 625 | 450 | 400 | 337½ |
| 30 | 300 | 260 | 215 | 170 |
| 60 | 175 | 190 | 140 | 100 |

TABLE II.—AT ROOM TEMPERATURE—75° F.

[1% Solution]

| Speed | Spindle | | | |
|---|---|---|---|---|
| | #4 | #3 | #2 | #1 |
| pH 10.5 (1% concentrated NH₄OH added) | | | | |
| 6 | 500 | 250 | 175 | 150 |
| 12 | 375 | 175 | 137½ | 127½ |
| 30 | 250 | 120 | 95 | 94 |
| 60 | 150 | 90 | 67.5 | 70½ |
| pH 4.5 (1% concentrated HCl added) | | | | |
| 6 | | 100 | 75 | 55 |
| 12 | | 75 | 56¼ | 50 |
| 30 | 100 | 60 | 45 | 51 |
| 60 | 75 | 45 | 40 | 48 |
| with 1% NaCl | | | | |
| 6 | 500 | 200 | 225 | 212½ |
| 12 | 375 | 250 | 212½ | 205 |
| 30 | 200 | 180 | 185 | 190 |
| 60 | 100 | 150 | 152½ | 100 |
| with 1% CaCl₂ | | | | |
| 6 | | | 387½ | 395 |
| 12 | | 400 | 350 | 372½ |
| 30 | | 280 | 260 | |
| 60 | | 190 | 167½ | |

The thixotropic properties of the compounds of the present invention are clearly illustrated in the above tables by the fact that, in general, the lower the spindle speed, the higher the viscosity. This makes them ideal static thickening agents for paints, lotions creams and various other types of solutions and emulsions. These compounds are also highly useful in the drilling of oil because they act to keep the clay in suspension and prevent its settling out. By so doing, the clay is kept fluid and the drilling operation is thereby considerably aided. In this same oil drilling operation, these compounds also find great utility as thickening agents and as biocides. In this respect pumping mixtures are generally pumped through the casing to carry up the drilling refuse. These pumping mixtures usually comprise about 50% of a heavy salt such as barium sulfate or barium carbonate, about 45% water-in-oil emulsion and about 5% thickeners, emulsifiers, buffer salts, etc. The thickener heretofore generally used was carboxymethyl cellulose. However, by substituting the quaternary compounds of this invention for the carboxymethyl cellulose, not only is the pumping mixture very satisfactorily thickened but the quaternary exerts a biocidal action to keep slime (algae, etc.) at a minimum. The thixotropic properties of these quaternaries also makes them automatically seal up leaks and fissures in the substrata.

Illustrative of the biocidal properties of the compounds of the present invention, in bacteriostatic tests, a 0.5% concentration of behenyl trimethyl ammonium benzosulfimide showed a halo of 3 mm. against *Staphyloccus aureus* 209, while at 0.05% concentration, there was a halo of 1 mm.

Obviously many modifications and variations of the present invention are possible in the light of the above teachings. It is, therefore, to be understood that within the scope of the appended claims, the invention may be practiced otherwise than as specifically described.

The invention claimed is:

1. A method of increasing the viscosity of an aqueous composition which comprises incorporating into the composition a quaternary ammonium benzosulfimide having four saturated alkyl groups attached to the nitrogen atom of the quaternary ammonium radical, one of said groups being a long-chain alkyl having at least 14 carbon atoms in the chain and the other three groups being lower alkyls having from 1 to 5 carbon atoms in the chain, and increasing the amount of water in the composition to increase the viscosity thereof in direct proportion to the increase of water.

2. A water-base paint containing polyvinyl acetate as the major solids component and including a quaternary ammonium benzosulfimide as a thickening agent, said quaternary ammonium benzosulfimide having four saturated alkyl groups, one of said alkyl groups having at least 14 carbon atoms in the chain and the other three alkyl groups having from 1 to 5 carbon atoms in the chain, being present in an amount sufficient to effect thickening of said paint in static condition.

3. A water-base paint having a total solids content of about 51% by weight, about 45% by weight of said solids content being constituted by polyvinyl acetate, and said paint also including behenyl trimethyl ammonium benzosulfimide in an amount sufficient to effect thickening of said paint in static condition.

4. A method of treating oil wells which comprises injecting into a well a quaternary ammonium benzosulfimide wherein there are four saturated alkyl groups attached to the nitrogen atom of the quaternary ammonium radical, one of said groups being a long-chain alkyl having at least 14 carbon atoms in the chain and the other three groups being lower alkyls having from 1 to 5 carbon atoms in the chain.

5. A method of removing refuse from an oil well while simultaneously sealing leaks and fissures in the substrata and inhibiting the growth of microorganisms which comprises pumping into the well a cleaning mixture containing heavy salts in a water-in-oil emulsion and a quaternary ammonium benzosulfimide wherein there are four saturated alkyl groups attached to the nitrogen atom of the quaternary ammonium radical, one of said groups being a long-chain alkyl having at least 14 carbon atoms in the chain and the other three groups being lower alkyls having from 1 to 5 carbon atoms in the chain.

References Cited

UNITED STATES PATENTS

| | | | |
|---|---|---|---|
| 2,372,180 | 3/1945 | Neher et al. | 252—311 |
| 2,385,800 | 10/1945 | Douty et al. | 260—29.6 |
| 2,725,326 | 11/1955 | Shibe et al. | 260—301 |
| 3,026,281 | 3/1962 | Harren et al. | 260—29.6 |
| 3,032,523 | 5/1962 | Jennings et al. | 260—29.6 |
| 3,040,821 | 6/1962 | Widess | 252—8.5 |

FOREIGN PATENTS

| | | |
|---|---|---|
| 539,277 | 4/1957 | Canada. |
| 578,341 | 6/1959 | Canada. |

OTHER REFERENCES

"Arquads," publication by Armour and Co. (1954).

SAMUEL H. BLECH, *Primary Examiner.*

JULIUS GREENWALD, *Examiner.*

H. B. GUYNN, *Assistant Examiner.*